US008015504B1

(12) United States Patent
Lynch et al.

(10) Patent No.: US 8,015,504 B1
(45) Date of Patent: Sep. 6, 2011

(54) SYSTEM AND METHOD FOR COMMUNICATING INFORMATION OVER A NETWORK

(75) Inventors: Kevin Lynch, San Francisco, CA (US); David Calaprice, San Francisco, CA (US); Ethan Malasky, San Francisco, CA (US); Tracy Stampfli, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 659 days.

(21) Appl. No.: 11/090,402

(22) Filed: Mar. 25, 2005

Related U.S. Application Data

(60) Provisional application No. 60/556,721, filed on Mar. 26, 2004, provisional application No. 60/556,595, filed on Mar. 26, 2004, provisional application No. 60/556,966, filed on Mar. 26, 2004.

(51) Int. Cl.
*G06F 3/048* (2006.01)

(52) U.S. Cl. ........ 715/805; 715/804; 715/781; 715/764; 715/700

(58) Field of Classification Search .................. 715/805, 715/804, 781, 764, 700
See application file for complete search history.

(56) References Cited

U.S. PATENT DOCUMENTS

| | | | |
|---|---|---|---|
| 5,157,763 A | 10/1992 | Peters et al. | |
| 5,301,268 A | 4/1994 | Takeda | |
| 5,555,416 A | 9/1996 | Owens et al. | |
| 5,606,674 A | 2/1997 | Root | |
| 5,625,809 A | 4/1997 | Dysart et al. | |
| 5,694,563 A | 12/1997 | Belfiore et al. | |
| 5,781,192 A | 7/1998 | Kodimer | |
| 5,784,058 A | 7/1998 | LaStrange et al. | |
| 5,801,693 A | 9/1998 | Bailey | |
| 5,835,777 A | 11/1998 | Staelin | |
| 5,886,699 A | 3/1999 | Belfiore et al. | |
| 5,924,099 A | 7/1999 | Guzak et al. | |
| 5,999,740 A | 12/1999 | Rowley | |
| 6,009,274 A | 12/1999 | Fletcher et al. | |
| 6,028,965 A | 2/2000 | Normile | |
| 6,061,058 A | 5/2000 | Owens et al. | |
| 6,067,582 A | 5/2000 | Smith et al. | |
| 6,125,388 A | 9/2000 | Reisman | |
| 6,216,152 B1 | 4/2001 | Wong et al. | |

(Continued)

FOREIGN PATENT DOCUMENTS

WO WO0043913 7/2000

(Continued)

OTHER PUBLICATIONS

Corporate Portals Letter, vol. 1, No. 10, Oct. 2000.*

(Continued)

*Primary Examiner* — Tadeese Hailu
*Assistant Examiner* — Darrin Hope
(74) *Attorney, Agent, or Firm* — Fish & Richardson P.C.

(57) ABSTRACT

A system and method displays information for a multiple programs, each containing zero or one agent, an application, and zero or more pods. The agent communicates with another device such as a network to retrieve or provide information. Information to or from the agent is displayed by an application in a window that is used by other applications, one application at a time. Information to or from the agent is also displayed in one or more windows, each window dedicated to a single pod, and such window being much smaller than the window displaying information from the application.

33 Claims, 6 Drawing Sheets

U.S. PATENT DOCUMENTS

| | | | |
|---|---|---|---|
| 6,272,493 | B1 | 8/2001 | Pasquali |
| 6,314,565 | B1 | 11/2001 | Kenner et al. |
| 6,321,209 | B1 | 11/2001 | Pasquali |
| 6,378,128 | B1 | 4/2002 | Edelstein et al. |
| 6,418,555 | B2 | 7/2002 | Mohammed |
| 6,434,563 | B1 | 8/2002 | Pasquali et al. |
| 6,535,882 | B2 | 3/2003 | Pasquali |
| 6,557,054 | B2 | 4/2003 | Reisman |
| 6,606,744 | B1 | 8/2003 | Mikurak |
| 6,618,716 | B1 | 9/2003 | Horvitz |
| 6,636,856 | B2 | 10/2003 | Pasquali |
| 6,654,765 | B2 | 11/2003 | Wong et al. |
| 6,658,419 | B2 | 12/2003 | Pasquali |
| 6,687,745 | B1 | 2/2004 | Franco et al. |
| 6,757,365 | B1 | 6/2004 | Bogard |
| 6,785,885 | B2 | 8/2004 | Norris et al. |
| 6,803,929 | B2 | 10/2004 | Hinegardner et al. |
| 6,839,714 | B2 | 1/2005 | Wheeler et al. |
| 6,904,569 | B1 | 6/2005 | Anderson |
| 6,944,821 | B1 | 9/2005 | Bates et al. |
| 6,961,907 | B1 | 11/2005 | Bailey |
| 7,080,139 | B1 | 7/2006 | Briggs et al. |
| 7,085,817 | B1 | 8/2006 | Tock et al. |
| 7,127,405 | B1 | 10/2006 | Frank et al. |
| 7,155,729 | B1 | 12/2006 | Andrew et al. |
| 7,263,545 | B2 | 8/2007 | Digate et al. |
| 7,287,097 | B1 | 10/2007 | Friend et al. |
| 7,293,242 | B2 | 11/2007 | Cossey et al. |
| 7,296,244 | B2 | 11/2007 | Martinez et al. |
| 7,299,259 | B2 | 11/2007 | Petrovykh |
| 7,305,453 | B2 | 12/2007 | Awamoto et al. |
| 7,310,781 | B2 | 12/2007 | Chen et al. |
| 7,337,210 | B2 | 2/2008 | Barsness |
| 7,370,278 | B2 | 5/2008 | Malik |
| 7,383,308 | B1 | 6/2008 | Groves et al. |
| 7,383,356 | B2 | 6/2008 | Gargi |
| 7,386,841 | B2 | 6/2008 | Huang et al. |
| 7,392,306 | B1 | 6/2008 | Donner et al. |
| 7,395,500 | B2 * | 7/2008 | Whittle et al. ............ 715/243 |
| 7,434,048 | B1 | 10/2008 | Shapiro et al. |
| 7,451,218 | B2 | 11/2008 | Malik et al. |
| 7,478,336 | B2 | 1/2009 | Chen et al. |
| 7,487,550 | B2 | 2/2009 | Todd |
| 7,617,458 | B1 | 11/2009 | Wassom, Jr. et al. |
| 2001/0034244 | A1 | 10/2001 | Calder et al. |
| 2002/0049633 | A1 | 4/2002 | Pasquali |
| 2002/0055975 | A1 | 5/2002 | Petrovykh |
| 2002/0065110 | A1 | 5/2002 | Enns et al. |
| 2002/0069264 | A1 | 6/2002 | Pasquali |
| 2002/0080179 | A1 | 6/2002 | Okabe et al. |
| 2002/0103902 | A1 | 8/2002 | Nagel et al. |
| 2003/0050932 | A1 | 3/2003 | Pace et al. |
| 2003/0208491 | A1 | 11/2003 | Pasquali |
| 2004/0093563 | A1 | 5/2004 | Pasquali |
| 2004/0111478 | A1 | 6/2004 | Gross et al. |
| 2004/0143633 | A1 | 7/2004 | McCarty |
| 2004/0186918 | A1 | 9/2004 | Lonnfors et al. |
| 2004/0205134 | A1 | 10/2004 | Teven et al. |
| 2005/0021652 | A1 * | 1/2005 | McCormack ............ 709/207 |
| 2005/0049960 | A1 | 3/2005 | Yeager |
| 2005/0050462 | A1 * | 3/2005 | Whittle et al. ............ 715/517 |
| 2005/0086290 | A1 | 4/2005 | Joyce et al. |
| 2005/0086640 | A1 | 4/2005 | Kolehmainen et al. |
| 2005/0097061 | A1 | 5/2005 | Shapiro et al. |
| 2005/0172241 | A1 | 8/2005 | Daniels et al. |
| 2005/0198581 | A1 | 9/2005 | Soderberg et al. |
| 2005/0203892 | A1 | 9/2005 | Wesley et al. |
| 2005/0210401 | A1 | 9/2005 | Ketola et al. |
| 2005/0257128 | A1 | 11/2005 | Pasquali et al. |
| 2005/0262521 | A1 | 11/2005 | Kesavarapu |
| 2006/0025091 | A1 | 2/2006 | Buford |
| 2006/0085796 | A1 | 4/2006 | Hoerle et al. |
| 2006/0095524 | A1 | 5/2006 | Kay et al. |
| 2006/0271526 | A1 | 11/2006 | Charnock et al. |

FOREIGN PATENT DOCUMENTS

| | | |
|---|---|---|
| WO | WO0049545 | 8/2000 |

OTHER PUBLICATIONS

Kolehmainen et al., U.S Appl. No. 60/513,050, titled: Systems and Methods for Facilitating Software Development and Communications Efficacy, filed Oct. 21, 2003.

Focus on HP OpenView, Nathan J. Muller, Mar. 1995, Chapters 8, 9, 10.

RealPresenter Plug-in, User's Guide Version 5.0, Real NetworksInc., 1998, 29 pages.

Netscape 7.1 Upgrade Guide, 8 pages, 2003.

Lambert, Karine, Authorized Officer, European Patent Office, International Search Report, Application No. PCT/US2008/066184, mailed Nov. 6, 2008, 15 pages.

Lambert, Karine, Authorized Officer, European Patent Office, International Search Report, Application No. PCT/US2008/066188, mailed Nov. 6, 2008, 15 pages.

Sun Microsystems, Inc., Java™ Network Launching Protocol & API Specification (JSR-56) Version 1.5 [Online] May 2001, XP007906066. Retrieved from the Internet: URL: http://cds.sun.coni/is-bin/INTERSHOP.enfinity/WFS/CDS-CDS_Developer-Site/en_US/-/USD/VerifyItem-Start/jnlp-1_5-mr-spec.pdf?BundledLineItemUUID=gvVIBe.pDpoAAAEdPR1iMS9Y&OrderID=0Q51Be.pB8IAAAEdMBliMS9Y&ProductID=fL_ACUFB1v0AAAEY2U45AXuV&FileName=/jnlp-1_5-mr-spec.pdf> (Retrieved on Nov. 24, 2008), pp. 1-85.

Sun Microsystems, Inc., "Auto Downloading JREs using Java™ Web Start and Java™ Plug-in" [Online] Feb. 2007, pp. 1-3, XP007906067. Retrieved from the Internet: URL: hitp://web.archive.org/web/20070207051627/http://java.sun.com/j2se/ 1.5.0/docs/guide/javaws/developersguide/autod1.03.06.html> (Retrieved on Nov. 28, 2004).

Sun Microsystems, Inc., Packaging JNLP Applications in a Web Archive, Java198 Web Start 1.4.2 [Online] Aug. 2005, pp. 1-11, XP007906068. Retrieved from the Internet: URL: http://web.archive.org/web/20050828081147/http://java.sun.com/j2se/1.4.2/docs/guide/jws/downloadservletguide.html> (Retrieved on Nov. 28, 2004).

Phillip J. Windley, "REST: Representational State Transfer," Chapter 11, Mar. 22, 2005, pp. 237-261.

Office Action, U.S. Appl. No. 11/089,699 mailed Jun. 25, 2008, 122 pages.

Office Action, U.S. Appl. No. 11/089,699 mailed Dec. 15, 2008, 8 pages.

Office Action, U.S. Appl. No. 11/089,699 mailed Jul. 9, 2009, 10 pages.

Office Action, U.S. Appl. No. 11/090,741 mailed Aug. 28, 2008, 26 pages.

Final Office Action, U.S. Appl. No. 11/090,741 mailed Mar. 6, 2009, 40 pages.

Office Action, U.S. Appl. No. 11/280,714 mailed Jun. 11, 2009, 27 pages.

Office Action, U.S. Appl. No. 11/282,916 mailed Jan. 28, 2009, 15 pages.

Final Office Action, U.S. Appl. No. 11/282,916 mailed Jul. 9, 2009, 26 pages.

Office Action, U.S. Appl. No. 11/282,217 mailed Feb. 5, 2009, 16 pages.

U.S. Appl. No, 11/282,916, filed Nov. 18, 2005, Office Action dated Jul. 9, 2009, to be published by the USPTO, 26 pages.

U.S. Appl. No. 11/282,217, filed Nov. 18, 2005, Office Action dated Aug. 5, 2009, to be published by the USPTO, 19 pages.

U.S. Appl. No. 11/280,714, filed Nov. 15, 2005, Office Action dated Dec. 24, 2009, to be published by the USPTO, 34 pages.

U.S. Appl. No. 11/090,402, Non-Final Office Action dated Aug. 6, 2009, 24 pages.

U.S. Appl. No. 11/090,741, Non-Final Office Action dated Jan. 7, 2010, 51 pages.
U.S. Appl. No. 11/280,714, Final Office Action dated Dec. 24, 2009, 34 pages.
U.S. Appl. No, 11/282,916, Final Office Action dated Jul. 9, 2009, 26 pages.

U.S. Appl. No. 11/282,217, filed Nov. 18, 2005, Non-Final Office Action dated Feb. 5, 2009, to be published by the United States Patent and Trademark Office, 16 pages.
U.S. Appl. No. 11/282,217, Non-Final Office Action dated Jan. 4, 2010, 20 pages.

* cited by examiner

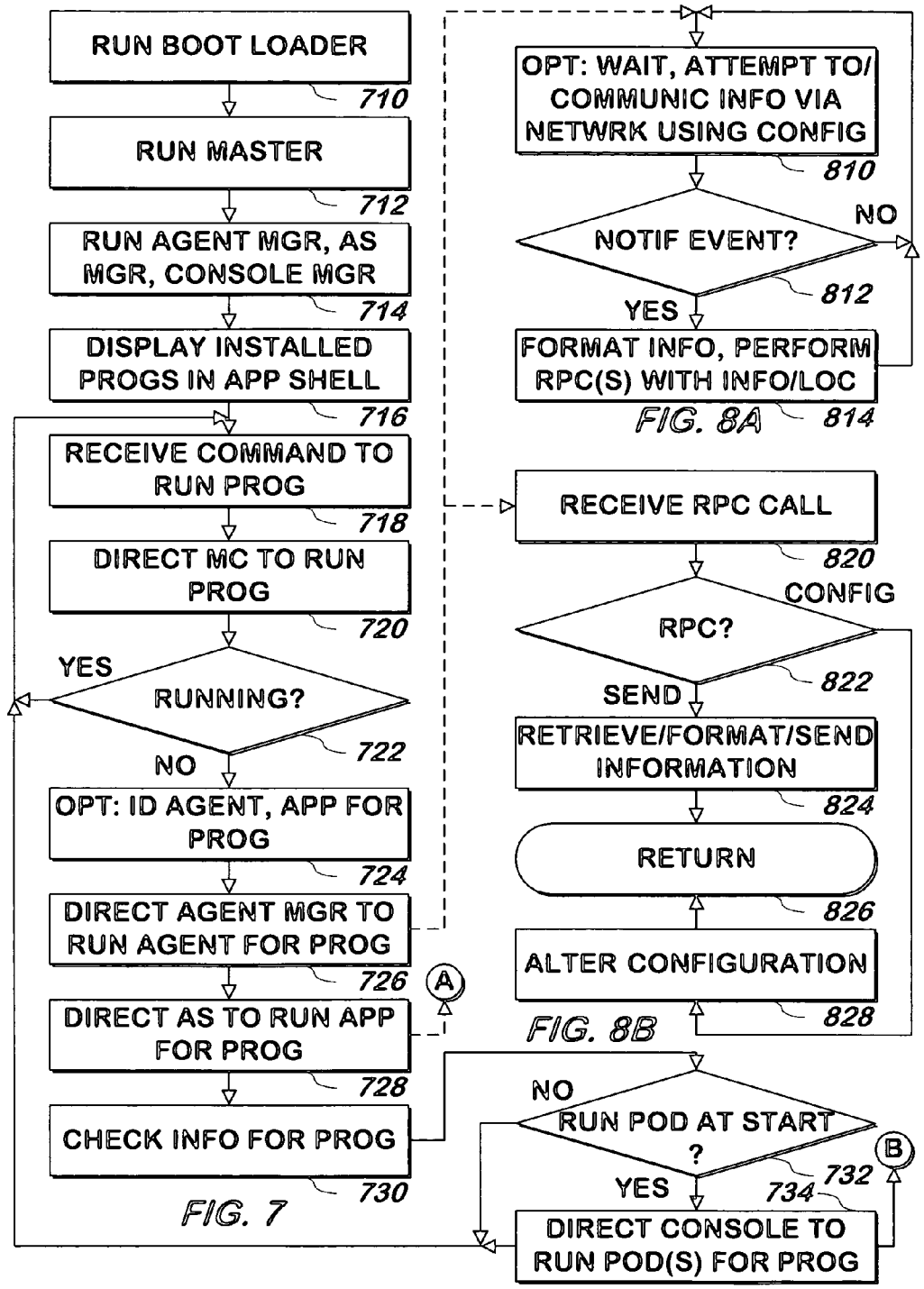

SYSTEM AND METHOD FOR COMMUNICATING INFORMATION OVER A NETWORK

RELATED APPLICATIONS

This application claims the benefit of U.S. provisional application Ser. No. 60/556,721 entitled, "Method and Apparatus for Communicating Information Over a Network" filed on Mar. 26, 2004 by Kevin Lynch, David Calaprice, Ethan Malasky and Tracy Stampfli; U.S. provisional application Ser. No. 60/556,595 entitled, "Method and Apparatus for Installing One or More Programs and At Least a Portion of Their Environment" filed on Mar. 26, 2004 by Kevin Lynch, Tracy Stampfli, Peter Grandmaison and Rebekah Hash; and U.S. provisional application Ser. No. 60/556,966 entitled, "Method and Apparatus for Updating One or More Programs and Their Environment" filed on Mar. 26, 2004 by Tracy Stampfli and Rebekah Hash, each having the same assignee as this application and each is incorporated herein by reference in its entirety.

This application is related to application Ser. No. 11/089,699 entitled, "System and Method for Installing One or More Programs and At Least a Portion of Their Environment" filed on Mar. 25, 2005 by Kevin Lynch, Tracy Stampfli, Peter Grandmaison and Rebekah Hash; and application Ser. No. 11/090,741 entitled, "System and Method for Updating One or More Programs and Their Environment" filed on Mar. 25, 2005 by Tracy Stampfli and Rebekah Hash, each having the same assignee as this application and each is incorporated herein by reference in its entirety.

FIELD OF THE INVENTION

The present invention is related to computer software and more specifically to computer software for communicating information over a network.

BACKGROUND OF THE INVENTION

Computer programs may be operated to allow the user to receive information from, and provide information to, the computer programs. In the case of many window-based operating systems, the user can keep several programs running at the same time, and manipulate a particular window of interest to view the information displayed by the program corresponding to that window.

The user may manipulate the windows by moving them around, moving one window in front of another, resizing the window, minimizing the window or maximizing the window to allow the user to view the information the user requires at the time, given the constraints of the size of the screen.

Because many computer programs primarily employ a single primary window that occupies a large portion of the user's computer screen, if the user uses many such computer programs, it can be necessary to perform such manipulations of the various windows many times throughout the day. User's find such manipulations cumbersome. Furthermore, the manipulation takes time and can distract from the user's thought process.

Some of the information provided by some computer programs may be relevant to the user throughout the day, and so the user would prefer to consult the information frequently. Other information displayed by the same program may be relevant only to the task at hand. For example, many conventional chat programs display not only the chat message, but a list of people known to the user with whom communications may be made. The user may not wish to use the chat program until the user sees someone on the list of people with whom the user would like to chat. If the chat program and the list of users occupies a single window, the user is then faced with the dilemma of whether to display the chat program to see the list, yet occupy a large amount of the screen with the complete chat program, or minimize or otherwise hide the window in which the chat program is displayed, but miss the information that someone with whom the user would prefer to chat is available.

The user can reposition the chat window to one side of the screen, and then resize and reposition another program with which that user is working to cover all but the portion of the chat window that displays the list of users with whom communications may be made, but such repositioning and resizing must be performed for every other program the user would like to maintain on his computer screen throughout the day. Not only is this extremely cumbersome, but the user's screen can appear cluttered, making the user experience less than desirable.

Additionally, if the user wishes to use the chat program, the user must bring the window displaying it to the front of the other windows, even if the user only wants to perform some action on the list of users. The remainder of the chat program window will then obscure the other windows the user has open. When the user has completed the task, the user must then remember how to remanipulate the other window or windows in front of the chat program to the way he or she had arranged them before.

It might be possible to design the programs the user uses to display far smaller amounts of information on any one screen, allowing each program to occupy less space on a computer screen. However, this would require the user to advance through so many screens to see the information the user wished to see that it would be undesirable for the user.

Some conventional programs employ two windows to make it easier for the user to manipulate the windows to suit the user's needs. For example, the conventional AOL Instant Messenger product commercially available from America Online Corporation of Dulles, Va. employs a "Buddy List" window containing a list of other potential users of the chat program designated as the user's "buddies". The Buddy List window appears in a separate window from the portion of the chat program that is used to chat with other users. The Buddy List program can also be used to launch still other programs using icons displayed in the Buddy List program. Still other programs, such as a stock ticker, run in the buddy list window.

However, each program launched from the Buddy list program spawns its own new window, different from the windows spawned by the others, adding to the cluttered appearance of the screen. Furthermore, there is no way for the user to add or remove programs that appear in the Buddy List window, requiring users who are disinterested in stock ticker information to view the stock ticker all day long, or reposition or resize the window or other windows to block it. Additionally, because the Buddy List window is not limited to information the user has selected, but also contains buttons to launch various programs, the window that a user is most likely to want to have persist on his computer system during the day is made much larger than is necessary for a user who just wants to see the buddy list. Additionally, the buddy list window appears to have to remain open when the spawned window is used, restricting the user's choice of how to use the available screen space. Also, there is no way to launch the buddy list from the spawned window.

What is needed is a system and method that can allow information from programs that it is desirable to keep displayed on the screen for an extended period of time to be shown in a window small enough to persist on the screen without requiring the user to perform many window manipulations during the day to keep such window out of the way of other windows the user may wish to use, and without forcing the user to view information for other programs the user does not find desirable, while allowing the user to access another larger window of the program that contains more information and may be easier for the user to use, without causing a cluttered appearance on the display screen as the user attempts to use the various programs, and that provides an easy way to switch between the various windows or interact between one window and the other.

SUMMARY OF INVENTION

A system and method allows programs to be made of any of three components: an agent, an application and a pod. The agent is used to communicate with a network. The pod is used to communicate with the user in a small window format, with the windows used for the pods from different programs arranged in a console for a uniform, uncluttered appearance. The application is used to allow the user to view and provide information in a window that is larger than window used for the pod, such window being used to display the applications of different programs at different times, so that the user can view the larger format application window for each of the applications without having to manipulate multiple such windows, thereby reducing screen clutter as well. An application shell contains the application window, as well as a set of user interface controls that allow the user to execute or select for display the various applications. User interface controls displayed by the applications and the pods allow pods to be launched from the applications and applications to be launched or viewed from the pod in a logical manner.

BRIEF DESCRIPTION OF THE DRAWINGS

FIG. 7 is a flowchart illustrating a method of running one or more programs that communicate information, such as via a network, according to one embodiment of the present invention.

FIG. 8A is a flowchart illustrating a method of executing an agent according to one embodiment of the present invention.

FIG. 8B is a flowchart illustrating a method of responding to a remote procedure call by an agent according to one embodiment of the present invention.

DETAILED DESCRIPTION OF A PREFERRED EMBODIMENT

Figure 1:
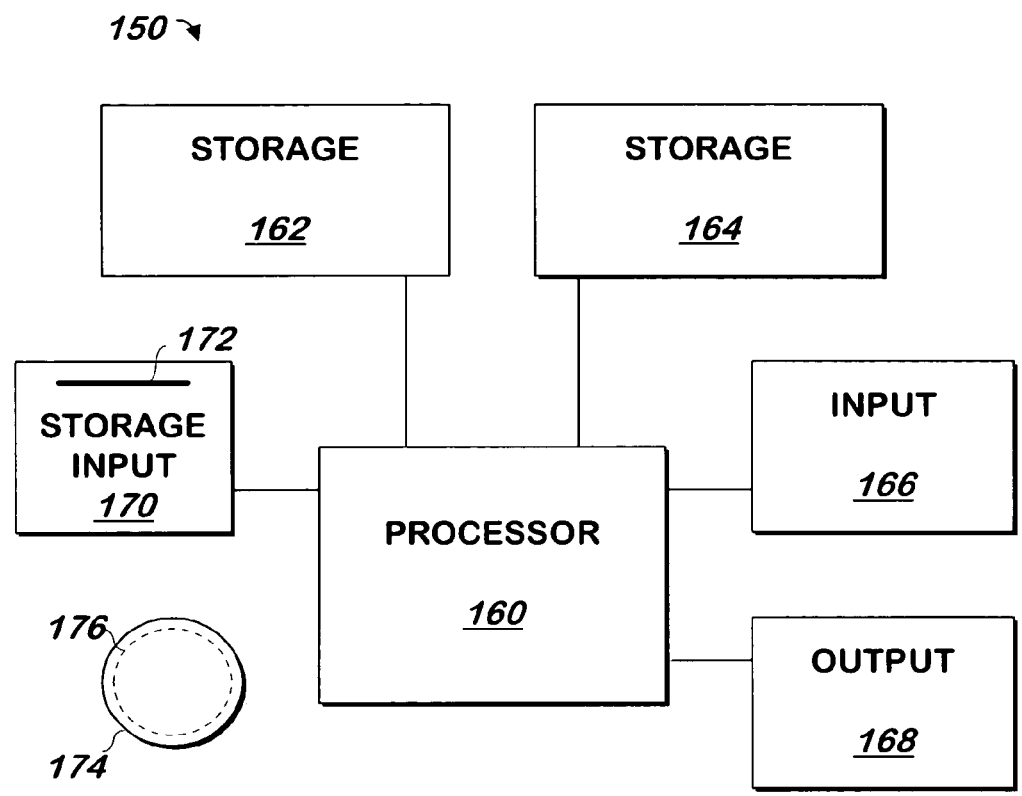
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard, mouse, camera, microphone or any of these allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
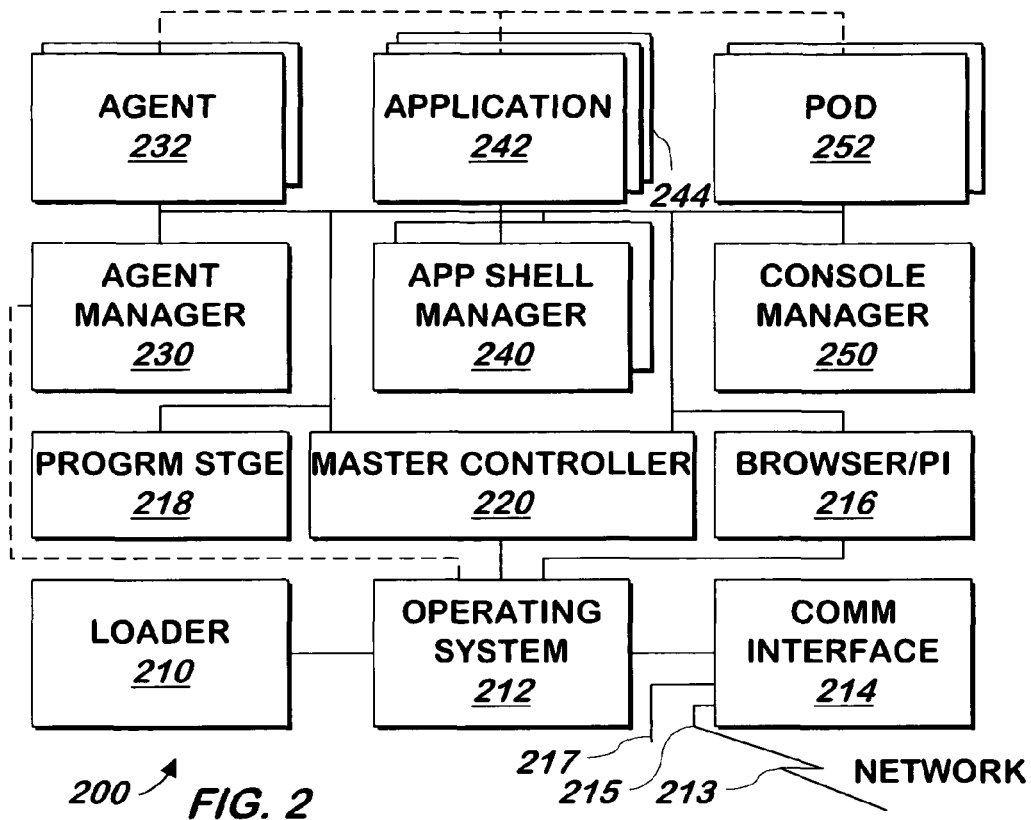
FIG. 2 is a block schematic diagram of a system for displaying information to a user of a computer system using multiple windows according to one embodiment of the present invention.

Referring now to FIG. 2, a system 200 for displaying information in multiple windows to a user of a computer system is shown according to one embodiment of the present invention.

Loading: A Boot Loader Loads the Master Controller, which Loads the Agent Manager, App Shell Manager and Console Manager; the Boot Loader can be Loaded Via the Operating System or a Web Page.

When a user wishes to use system 200, the user signals operating system 212 or browser/plug in 216. If the user starts system 200 by signaling operating system 212, if system 200 has been installed, operating system 212 loads and executes loader 210. If the user starts system by signaling browser/plug in 216, browser/plug in 216 signals operating system 212 to load and execute loader 210 if system 200 is installed. In one embodiment, browser/plug in 216 is a conventional browser, running a plug in such as the Flash Player plug in commercially available from Macromedia, Inc of San Francisco, Calif., that is running a Flash movie program, such as a conventional .swf file.

The Flash movie program used is a conventional program that contains instructions to direct the Flash Player plug in, optionally in conjunction with the browser 216, to cause operating system to load and execute loader 210 when the user so indicates. In general, Flash movie programs may contain any or all of A) images or other display information that the Flash Player plug in can animate by displaying them in rapid sequence, B) audio that can be played back to the user in sequence with the images, and C) instructions that describe operations the Flash Player plug in should perform, optionally in conjunction with the browser 216 and operating system 212. Information about the Flash Player plug in and .swf files is available at Macromedia.com, and such information is hereby incorporated by reference in its entirety.

The Flash movie program (also referred to as a Flash movie) may be retrieved by browser/plug in 216 via a network 213 such as the Internet or a local area network. The network 213 is coupled to browser/plug in 216 via input/output 215 of communication interface 214, which may include a conventional network interface, such as a conventional Ethernet interface running the conventional TCP/IP protocol and coupled to the Internet via a router (not shown). Communication interface may also be coupled to a conventional monitor, mouse and keyboard, via input/output 217 and contains a suitable interface for such connection.

If system 200 has not been installed, it may be installed as described in one of the related applications. System 200 is maintained as described in another of the related applications.

When loaded by operating system 212, loader 210 loads master controller 220 and executes it in conjunction with operating system 212. In one embodiment, master controller 220 is a computer program, such as the conventional Flash Player or Flash Player plug in, modified as described herein, and a Flash movie program that causes it to operate as described herein, although any one or more computer programs that operates as described herein may be used. These components are provided as part of the Central product commercially available from Macromedia at Macromedia.com and described therein and such description is hereby incorporated by reference in its entirety.

When loaded and executed, master controller 220 loads and executes in conjunction with operating system 212 agent manager 230, application shell manager 240, and console manager 250. Each of these 230, 240, 250 are also Flash Players or Flash Player plug ins, modified as described herein, and containing a Flash movie that causes them to operate as described herein, although other computer software subsystems that operate as described herein may be used. A Flash Player plug in plays Flash movies in the form of .swf files having the format similar or identical to that described at Macromedia.com, and operate as a plug in to browser/plug in 216, although in another embodiment, one or more of master controller 220 and the managers 230, 240, 250 contains sufficient functionality to operate without the user of browser/plug in 216.

As noted above, a Flash movie may contain instructions, and such instructions may be in the form of action script commands to be executed by the Flash Player plug ins as described herein. However, other embodiments may incorporate other engines that execute instructions of other kinds in place of the Flash Player plug in and other kinds of instructions may be executed by such engine or a program may be used in place of the engine and instructions.

Figure 3:
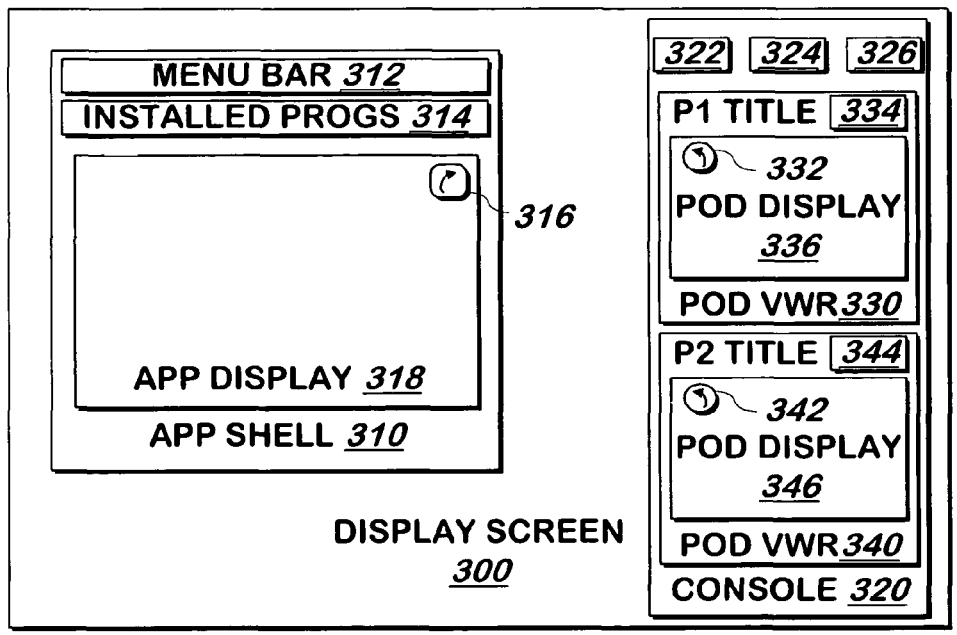
FIG. 3 is an illustration of a display screen of a computer system according to one embodiment of the present invention.

Initial Operation of App Shell Manager: Initial Display of the App Shell and Display of Installed Applications FIG. 3 illustrates a display screen 300 of a computer system for displaying information from programs according to one embodiment of the present invention. Referring now to FIGS. 2 and 3, an application shell 310 and a console 320 are shown on display screen 300, which may be any conventional display screen like a conventional CRT or flat panel LCD.

When application shell manager 240 is loaded and executed, it displays the application shell 310 of FIG. 3, and the components that are shown within application shell 310. Application shell 310 includes menu bar 312 containing a conventional pull down menu and installed programs area 314 containing icons corresponding to installed programs and other icons as described in more detail below. In one embodiment, system 200 is initially installed with several programs, including a program finder that allows the discovery and installation of still other programs via network 213. Programs are provided and installed as described one of the related applications. A child window, application display window 318 of the application shell 310, is used as described below to display information from applications and receive user input to such applications.

Although only one application shell 310 is displayed in the Figure, any number of application shells 310 may be displayed. To cause this display, a user provides a shortcut command to application shell manager 240, which signals master controller 220 to load and execute another application shell manager as shown in FIG. 2. In one embodiment, only a single application shell 310 is used.

Initial Display of Console: Console is not Used to Directly Install Applications or Show Applications that can be Installed or Other Extraneous Information.

When loaded by master controller 220 and executed, console manager 250 displays console 320 as a separate window from the application shell 310. The console 320 and applications shell 310 may be separately moved and resized or minimized. In one embodiment, console 320 does not have icons indicating individual applications (e.g. a single application for each of several icons) that may be installed or significantly extraneous material, other than a limited number of controls 322, 324, 326 that may appear at the top of the console and are not shown. Other than the controls at the top of console 320, console 320 has only zero or more pod viewers containing pods, described below. The area containing controls 322, 324, 326 is limited to an area that can be displayed as less than one inch in height at the top or other edge of console 320 on a nineteen inch monitor.

Loading and Operation of an Application in the Application Shell

Figure 4:
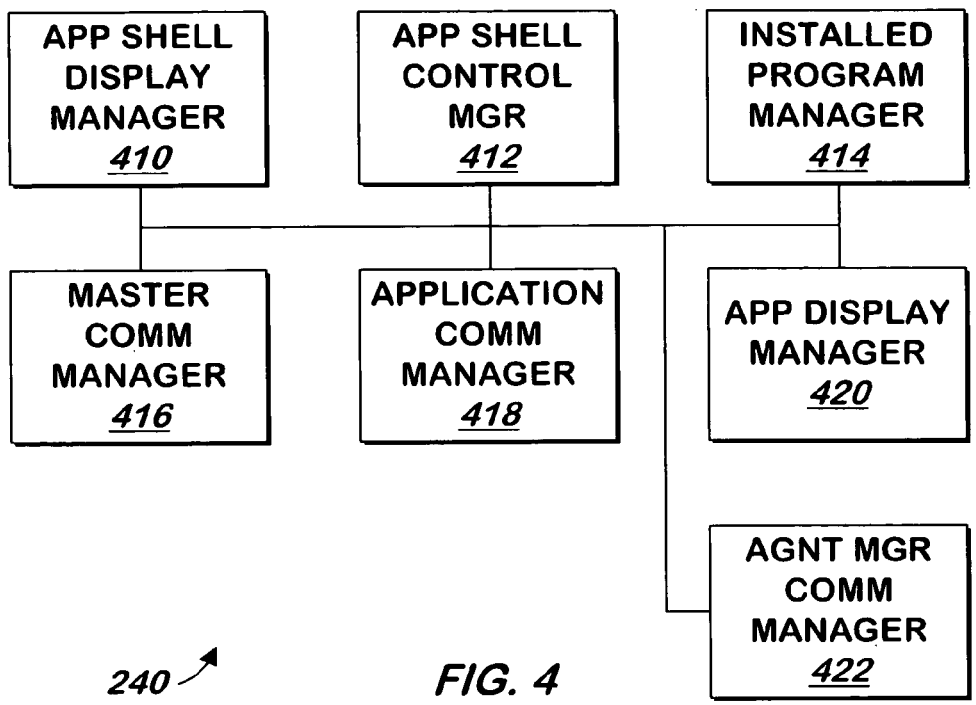
FIG. 4 is a block schematic diagram of application shell manager 240 of FIG. 2 shown in additional detail according to one embodiment of the present invention.

An application shell manager 240 according to one embodiment of the present invention is shown in more detail in FIG. 4. Referring now to FIGS. 1-4 and 6 (described below), when loaded and run by master controller 220, application shell manager 240 operates as described herein. Application shell display manager 410 manages the display of the application shell window 310 in conjunction with operating system 212. Application shell control manager 412 displays any controls for the application shell displayed as part of that window, including the menu bar 312, and responds to and processes requests or commands employing such controls.

Installed program manager 414 reads a reserved directory of storage 162 or 164 such as the hard disk to identify the programs stored therein, which may be identified by identifying all of the files having names with a specific extension in that directory, which is used to store them when the programs are installed. In one embodiment, such files with that extension contain or reference an icon that installed program manager 414 displays in push button controls in the installed programs area 314 of applications shell 310 to indicate that the program corresponding to that icon has been installed. Installed program manager 414 retains the name or other identifier of the program (which may be the filename of the file described above or contained in such file), and the boundaries of the corresponding control where it displays the icon.

When a user clicks on one of the controls containing the icons in installed programs area 314, operating system 212 signals installed program manager 414 with the position of the mouse at the time it was clicked and installed application manager 414 determines the program corresponding to the control clicked based on the position of the mouse and the location of the controls. Installed program manager 414 then informs master controller 220 of the name of the program corresponding to the icon on the control selected by the user.

When the information regarding the program selected by the user by clicking on the control with the program's icon is received, master controller 220 transmits a command to each of A) agent manager 230 to install and run the agent, B) applications shell manager 240 to install and run the application, and optionally, C) console manager 250 to install the pod, corresponding to the name of the program it receives. In one embodiment, the agent, application and pod are files in the .swf format with a name equal to the name of the program, and an extension that identifies each file as corresponding to that program's agent, application or pod (with multiple potential extensions corresponding to pods to allow more than one pod to be loaded).

In still another embodiment, a manifest file is retrieved upon installation of the program, and the manifest file contains the filename of each of the various files above. The filenames for each installed program are retained by master controller 220 and stored in program storage 218 at the time the program is installed, and these filenames are retrieved by master controller 220 and provided to the various managers 230, 240, 250 as described above (or they may be retained in the manifest for this purpose, with the name of the manifest implied from the name of the program or the name of the manifest being bound to the name of the program and stored in program storage 218 at the time of installation of the program).

In one embodiment, the name of the program or other information (e.g. the domain name from which the files or the manifest file had been downloaded to retrieve and install them) is provided by master controller 220 with the filenames to the managers 230, 240, 250 to allow them to provide this information to identify each related agent, application and one or more pods.

Managers 230, 240 and 250 load and execute the file corresponding to the command from master controller and the extension to which that manager 230, 240, 250 corresponds. The agent, application and one or more pods corresponding to a program in this fashion are referred to as "corresponding" to one another, as there may be multiple applications, agents and pods for any for any number of programs, either available to be run, or running simultaneously, as shown in the Figure.

In one embodiment, pods are not initially loaded with the application and agent, but may be loaded upon receipt of a user command, as described below. In still another embodiment, an indication as to whether the one or more pods corresponding to the program are to be loaded with the application may be specified in the manifest file used to install the program, described above. The indication is stored with the other information for the program in program storage 218 when the program is installed (or retained in the manifest), and master controller 220 retrieves and uses this indication to determine whether to direct console manager 250 to load and execute the one or more pods corresponding to the application and agent being loaded and executed at the time the program is started.

If agent manager 230, application shell manager 240 or console manager 250 is not running, master controller 220 directs operating system 212 to launch any such non-running ones of them and then instructs them to run the zero or one agent 232, one or more pods 252 and the application 242 corresponding to the program as described above. Any number of such programs may be running at any time. In one embodiment, when a program is run, master controller 220 directs operating system 212 to launch console manager 250, even if no pods corresponding to running applications are be initially displayed.

Operation of the Agent: a Windowless Player that Communicates with the Outside World to Retrieve Information and Provide it to the Apps and the Pods Using Remote Procedure Calls.

When signaled to load and run (i.e. execute) a file as an agent, agent manager 230 loads the file into memory as agent 232 and executes the instructions contained therein. (As used herein, to "load a file into memory" means to place it into a state to be run—it does not need to be physically moved or may be only partially loaded into memory.) In one embodiment, agents 232 are executed without being displayed in any window. In one embodiment, an agent 232 is used to collect information from the network 213 coupled to input/output 215 for the purpose of display by the application and/or pod or pods to which the agent corresponds, although an agent may also provide information to network 213 or process information or communicate information to and/or from a source other than network 213. Because each agent 232 executes as a Flash movie in the modified Flash player plug in to browser 216, agent 232 can communicate with network 213 such as the Internet via said browser 216 and communications interface 214. In another embodiment, agent manager 230 natively provides communication to and from network 213 in the manner of a browser and so the browser/plug in 216 is not used to communicate with the network 213 by agent manager 230. This is illustrated by the dashed line in FIG. 2 running from agent manager 230 to operating system 212.

Agent 232 may operate to retrieve information from network 213 and store it in program storage 218 for shared use by its corresponding application 242 and one or more pods 252, or it may provide such information from program storage 218 to its corresponding application 242 and/or one or more pods 252 via a remote procedure call to some or all of them, or it may perform all of these functions.

Whether browser/plug in 216 is used to communicate with network 213, all agents communicate with network 213 via agent manager 230. This allows agent manager 230 to restrict access to the network 213 as described in more detail below.

In one embodiment, agent 232 receives the information from the network and reformats it into two sets of information and stores it into program storage 218, which may be memory or disk storage that is available for use by the program. (The description of the operation of agent 232 refers to the agent as receiving information from network 213. However, agent 232 may provide information to network 213.) One set is formatted for use by the corresponding application 242, and another set is formatted for use by one or more pods 252. The sets may be stored in a reserved area of program storage 218 and a remote procedure call provided by agent 232 to any or all of the corresponding application 242 and one or more pods 252 corresponding to the agent 232 when agent 232 determines it should notify the corresponding application 242 or one or more pods 252, for example, if the information received from the network 213 is complete or if it has changed from what was received before. The remote procedure call may contain the information, or its location in program storage 218 to allow it to be received or retrieved and processed by application 242 and the one or more pods 252 that correspond to agent 232. If the application 242 or the one or more pods 252 are not running, when the remote procedure call would have been, or is, generated, agent 232 may retain the information that would have been provided to them and provide it to the application 242 or one or more pods 252 when they are run.

In one embodiment, agent 232 may employ operating system timers it sets to periodically retrieve information from network 212 and provide it to application 242, pods 252 or both via remote procedure calls as described above. In one embodiment, agent 232 preprocesses the information to determine whether a remote procedure call is warranted, for example, determining a remote procedure call is not warranted if the information retrieved from the network 213 does not contain differences or significant differences from what has already been obtained from the network by agent 232.

Applications: Allow the Display of Large Amounts of Information in a Large Window that can be Used to Configure the Program.

When the application file is loaded into memory and launched as an application 242 by application shell manager 240, application 242 displays a user interface in the application display window 318 defined by application shell manager 240. An initial user interface may be displayed in application display window 318 and then application 242 may receive (e.g. via remote procedure calls) or retrieve information received from its corresponding agent 232 and display the information that the corresponding agent 232 retrieved as described above. In one embodiment, instead of agent 232 providing the information to application 242 via remote procedure calls, application 242 may periodically request the information from agent 232 via a remote procedure call to agent 232 and in still another embodiment, application 242 may simply periodically retrieve the information stored in program storage by the corresponding agent 232 without any remote procedure call.

The application display window 318 is sized to be larger than the one or more windows in which the corresponding one or more pods 252 from the program are displayed as described below. This means the application display window 318 is, at least at some time, a relatively large display window corresponding to the program.

Use of Application to Configure Program

In one embodiment, a user may configure the program using the application 242, via conventional user interface elements such as buttons, list boxes, check boxes and the like that application 242 displays in the application display window 318. When the user configures the program in a manner that requires or can utilize a change in the operation of the corresponding agent 232, application 242 provides an indication of the configuration to agent 232 via a remote procedure call. The remote procedure call may contain the indication of the configuration, or application 242 may store the indication in program storage 218 and the remote procedure call may indicate where in program storage 218 the indication is stored. Alternatively, application 242 may store the configuration information into program storage 218 and not employ any remote procedure call. Agent 232 may check this configuration information in program storage 218 each time configuration information is required. Configuration information is information related to the configuration or manner of operation of the program.

The configuration of the program may involve a change to the operation of the one or more pods 252 of the program, either in addition to, or instead of, a change to the operation of the agent 232. In one such embodiment, application 242 may provide an indication of the configuration to the one or more corresponding pods 252, via the corresponding agent 232, depending on the configuration indicated by the user, with agent 232 optionally using one or more remote procedure calls to such one or more corresponding pods 252 in the same manner as is used from application 242 to the agent 232, as described above.

Once started, application 242 also responds to remote procedure calls it receives as described herein and updates the application display window 318 if necessary or desirable in response to the remote procedure call.

Thus, application 242 may display in application display window 318 the information received from the corresponding agent 232, or provide information to the corresponding agent 232 or one or more corresponding pods 252 that is received via user interface elements it displays in application display window 318.

In one embodiment, each program uses a single agent 232 that may retrieve information from, or provide information to, multiple sources and aggregates it for use by the corresponding application 242 or one or more corresponding pods 252. If there are multiple instances of an application, all instances may share a single agent. Communication from one application instance to another, and to all zero or more pods 252 for the program, may be routed through the agent 232. In still another embodiment, multiple agents 232 may be employed for each program, with each of the multiple agents (which operate like agent 232) retrieving information from, or providing information to, one or more sources different from the other agents.

If the user clicks on another control with a different icon in the installed programs area 314, applications shell manager 240 will load and execute the indicated application as described above, including allowing the display of information in the application display window 318, if the indicated application is not already running. If the application corresponding to the clicked icon is already running, application manager 240 assigns the application display window 318 to that application. In one embodiment, application display manager 420 manages the assignment or removal of an application to or from the application display window 318 as described herein.

In one embodiment, when a new or different application is loaded and run, the application 232 displayed in the application display window 318 prior to the user clicking on the icon is terminated and in another embodiment, that application continues to run, but will not be able to display output or receive input in the application display window 318. In such embodiment, only the most recently indicated application (i.e. the one most recently selected by the user as described herein) is able to display output or receive input via the application display window 318, though the others that are started and have not terminated continue to operate in the background.

In one embodiment, each application 242 may allow the user to load and execute the one or more pods 252 corresponding to the application 242 using a user interface element provided by that application 242. In such embodiment, when master controller 220 instructs the managers 230, 240, 250 to load the files as described above, it binds the agent, application and one or more pods together to allow them to interact as described herein. Each application 242 may display a user interface element such as a push button that contains an icon 316 in the application display window 318 that is used to start or otherwise signal the one or more pods 252 corresponding to that application. In one embodiment, the icon is a standard icon to be used by all applications 242 for this purpose or solely for this purpose. When the user uses the user interface element 316 to indicate that the one or more pods corresponding to the application should be displayed in console 320, application 242 signals application communication manager 418, which signals application shell communication manager 612 of master controller 220 (which is shown in more detail in FIG. 6) via master communication manager 416 with the name or other identifier of the program to which the application 242 corresponds. Application shell communication manager 612 then signals console manager 250 via console communications manager 614 to load and install the one or more pods corresponding to the program, as described above.

In one embodiment, certain icons displayed in the installed programs area 314 perform special functions and do not correspond to an installed application. If the user clicks on the icon, installed program manager 414 performs the functions. In one embodiment, one such function includes instructing all agents to stop or start communicating with the network 213 via input/output 215 as described above. If the user clicks the icon, installed program manager 414 signals agent manager 230 via agent manager communications manager 422 to block or allow (via a toggle) communications by agents such as agent 232 to and from the network 213.

Another icon in the installed programs area 314 suppresses or allows (via a toggle mechanism) alert messages from sounding an audible alert. If the user toggles the capability, installed program manager 414 signals master controller 220 to toggle the capability either on or off. Agents 232, applications 242 and pods 252, described below, can cause an audible alert via messages they send to master controller 220 via their respective managers 240, 250. Master controller 220 sounds the alert by signaling operating system 212 to generate an audible sound only if the capability is enabled at the time the alert is generated and does not sound the alert otherwise.

Another icon in the installed programs area 314 causes installed program manager 314 to run a preinstalled special application 244 that has no pod or agent, and that displays the other programs installed, allows a user to run each of them or stop each of them, or uninstall any of them. If the user instructs the special application 244 to run or stop a program, the special application 244 signals application communication manager 418, which signals master communication manager 416, both such signals containing the program name and whether the program is to be run or stopped. The signal is sent to master controller 220, which signals the managers 230, 240, 250 to load and execute the agent 232, application 242, or one or more pods 252 corresponding to the program as described above or to stop operation of the program based on the signal, and the managers 230, 240, 250 comply.

If the user indicates to the special program 244 that the program is to be uninstalled, the special program 244 sends a signal to stop that program as described above, and then signals master controller 220 to uninstall the program. Master controller 220 deletes the files corresponding to the program, such files being identified by their filename, the manifest, or via the list of files master controller 220 compiles and stores in program storage 218, as described above.

Pods

When started by master controller 220, console manager 250 displays console 320 on display screen 300. Console 320 may contain user interface controls 322, 324, 326 that relate to the operation of console 320, but does not contain any, or more than one, two or three controls that initiate the installation of one or more programs per control. In one embodiment, only one such control is provided in the console 320, and it only runs a program that can also be started from the installed programs area 314. This maintains the relatively small size of the console 320, while allowing a relatively large amount of functionality from the console in the event that the applications shell 310 is not displayed on the display screen 300. In one embodiment, there is no more than one control on the console 320 itself (as opposed to being on windows within the console) that control the operation of anything displayed in a window that is, at least in part, outside of the console 320 on display screen 300, and in another embodiment, there are not more than one, two or three such controls on the console 320 itself, although there may be such controls in the boundaries of the console 320, such as in the pod viewers 330, 340 or pods 336, 346, for example.

Figure 5:
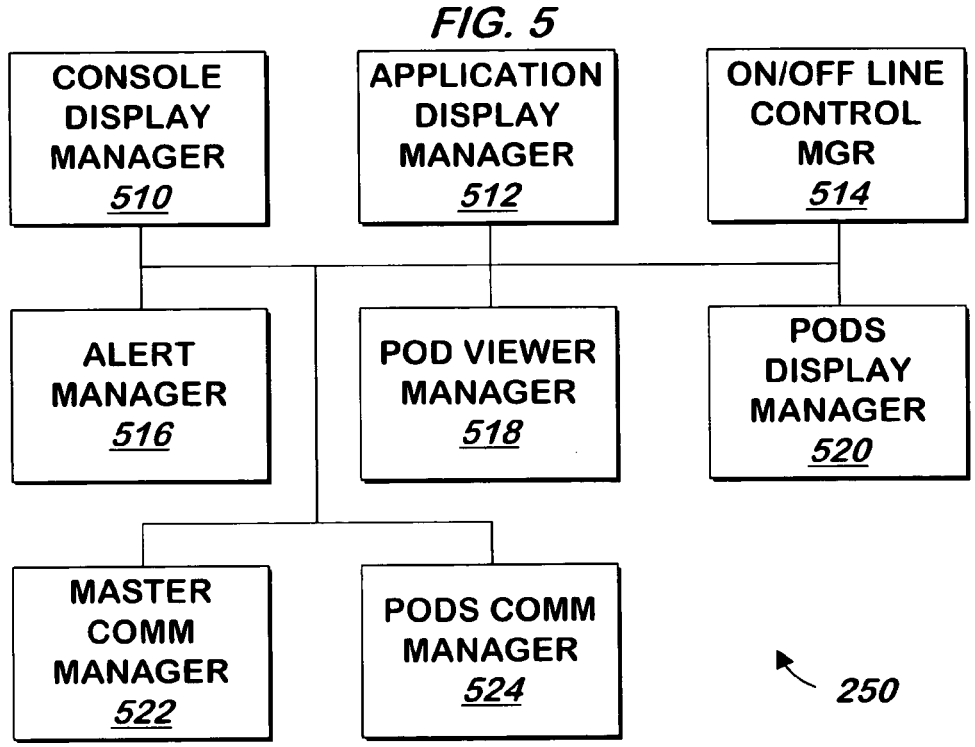
FIG. 5 is a block schematic diagram of console manager 250 of FIG. 2 shown in additional detail according to one embodiment of the present invention.
Figure 6:
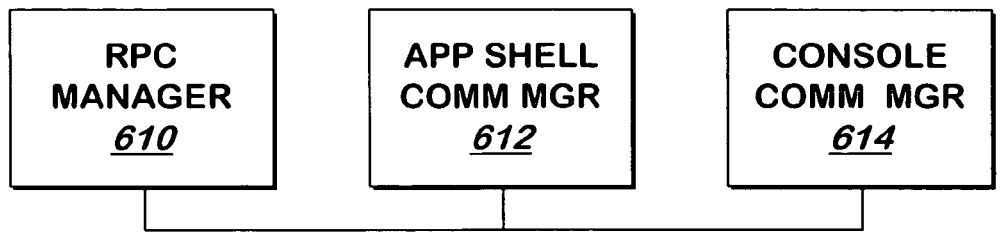
FIG. 6 is a block schematic diagram of master controller 220 of FIG. 2 shown in additional detail according to one embodiment of the present invention.

FIG. 5 illustrates console manager 250 in more detail according to one embodiment of the present invention. Referring now to FIGS. 1-6, console display manager 510 displays the console 320 on the display 300 as described above. The console is displayed towards an edge of the screen, in contrast to the application shell 310, which is displayed in a more central location of the display screen 300.

Console controls 322-326, described above and described in more detail below, are handled by managers 512-514, each of which will now be described.

In one embodiment, control 322 is a push button control that allows the user to view detailed information about installed applications that are displayed by installed program manager 414 as described above. If the user selects the control 322, which may be a conventional push button, operating system 212 signals application display manager 512. Application display manager 512 signals, via master controller communication manager 522, console communication manager 614 of master controller 220, which signals, via application shell communication manager 612 installed program manager 414 to run the special application 444 that displays a list of installed programs and additional detailed information about each such program as may be available as described above, and allows the user to start or stop the installed program or uninstall it as described above. The special application is displayed in the application display area 318 as described above and not in the console 320. Control 322 is a single control used to start, stop or uninstall any program that may be started, stopped or uninstalled, as opposed to a control that starts, stops or uninstalls an individual application, which would otherwise require multiple controls on console 320 to perform these functions for multiple applications, cluttering it and enlarging it. In one embodiment, the special application 344 is not used to install an application. However, in another embodiment, it may be used to install an application. In this embodiment, again, a single console control would be used for all applications, as opposed to employing multiple controls to operate multiple applications.

In one embodiment, control 324 causes all agents 332 to start or stop communicating with the network 213, as described above. If the user selects that control, which toggles to start or stop in one embodiment, operating system 212 signals on/off line control manager 514, which signals master controller 220 via master communication manager 522 and console communication manager 614. Console communication manager 614 signals agent manager 230, which either prohibits or allows all agents 232 of loaded programs to communicate with network 513 or not communicate with network 513 by toggling the status of such communications, even if such status was last altered via a different control, such as the push button in the installed programs area 314 as described above.

In one embodiment, control 324 may additionally include one or more other controls such as a push button to toggle the audible alerts as described above. Alert manager 516 receives an indication from operating system 212 if the user selects that push button or other control and alert manager 516 signals master controller 212 that the audible alert status should be toggled as described above.

In one embodiment, console 320 may contain one or more pod viewers 330, 340, which each contain a title P1 title, P2 title, one or more controls 334, 344, a pod display area 336, 346 and may contain other controls 332, 342, providing a uniform appearance for the pods. One pod viewer 330, 340 is provided for each pod display window 336, 346. Pod display windows 336, 346 for the pods from different programs may thus be arranged in the console 320 for a uniform, uncluttered appearance of the information from each of the pods. Each pod display area 336, 346 consists of a window in which a single pod 252 displays information retrieved by the corresponding agent 232 or allows the user to provide information (e.g. via conventional user interface elements such as text boxes, list boxes, etc).

Pod viewers are generated by pod viewer manager 518 for each pod that console manager 250 is requested to load and execute as described herein. In one embodiment, a pod viewer is a Flash movie that operates as described herein, but in another embodiment, a pod viewer may include computer code that operates as described herein or in a similar way. In one embodiment, titles P1 title, P2 title are retrieved by pod viewer manager 518 from a program manifest corresponding to the pod, and the titles display the name of the program. This means that, if two pods 252 are displayed for a given program, their titles will be displayed the same in each pod viewer 330, 340. Thus, the titles, P1 title, P2 title represent the program name to which the pods 232 correspond. This can help ensure that a user can identify the program corresponding to the pod display 336, 346 so that it cannot be faked. In another embodiment, titles P1 title, P2 title are provided by pod 252, which may itself be a Flash movie or other computer code. Controls 334, 344 may be any conventional control, such as a control that may be used to terminate the operation of a pod 252 or remove its pod viewer 330, 340 from console 320. In this embodiment, the titles P1 title, P2 title do not display the program name, although they can be if desired. Pod viewer manager 518 causes each pod viewer 330, 340 to define a pod display window 336, 346 in which each pod 252 may display information retrieved by the corresponding agent 232, user interface elements to receive information, or both of these.

There is one pod display 336, 346 for each pod running, although a user can stop the pod 252 from running (or stop it from being displayed in a pod display window 336) by clicking on control 334, 344 corresponding to the pod viewer 330, 340 being used to display the user interface of the pod 252. Thus, if multiple programs are running, a user can view more than one pod display window 336, 346 at a time in console 320. In contrast, although more than one application shell 310 may be run at the same time, there is only a single application display window 318 in each application shell 310 and applications are viewed through it one at a time.

A pod display window 336, 346 has a width defined by pod viewer manager 518, but a height that may be defined by the pod 252 that is displaying information, user interface elements or both in that pod display window 336, subject to a minimum, maximum, or both that is defined by pod viewer manager 518. The width of each pod display window 336, 346 is the same as the others in the console 320, and may be determined relative to the width of the console 320, so that the user may change the widths of all of the pod display windows 336, 346 by changing the width of the console 320 by dragging a side or corner, or by using other conventional means of resizing a window, although in another embodiment, the width of the console 320 is fixed. Console display manager 510 displays and adjusts the boundaries of console 320 to make it large enough to fit the viewers open, and controls 322-326 but little larger.

In one embodiment, pod 252 contains or is or is similar to a .swf-formatted Flash movie that may perform various functions, although other computer code may be used as a pod. As noted above, a Flash movie is an animated movie, but any set of instructions that can display information, provide a user interface and receive information, or both, may be used as a pod 252.

Pod 252 may obtain information to display to the user in a manner similar to that described above for application 242. For example, pod 252 may respond to remote procedure calls from the corresponding agent 232 when agent 232 has information for pod 252. The remote procedure call may contain the information itself, which pod 252 may internally store for display, or the remote procedure call may contain a description of where such information is stored in program storage 218 for retrieval by pod 252 and pod 252 may retrieve it and internally store it, or use it where it is stored in program storage 218. Either agent 232 or pod 252 may format the information for use by the pod 252. It isn't necessary for the pod 252 to receive information via a remote procedure call from agent 232. In other embodiments, pod 252 may request information via its own remote procedure call to agent 232 or pod 252 may retrieve information from program storage 218 directly, without contacting agent 232. Pod 252 may also provide information to program storage 218, or to agent 232 or application 242 or both via remote procedure calls to them.

Pod 252 displays information such as information received as described above from agent 232 in the pod display window 336, 346 assigned to pod 252 by pods display manager 520. The display of such information may be in accordance with the configuration information received by the application as described above. Because the pod display windows 336, 346 are small relative to the size of the screen, each pod 252 may display the information in a series of screens that may either automatically change from one screen to another (e.g. via one or more operating system timers set by pod 252) or may change in response to the user using user input elements provided on the pod display window 336, 346 by pod 252, or may change in response to either of these. In one embodiment, the information displayed in pod display window 336, 346 by a pod may correspond, at least in part, to information displayed in the application display window 318 by the corresponding application 242, either simultaneously or at different times.

In one embodiment, the information displayed by pod 252 is a summary or a subset of the information displayed by its corresponding application 242. The information may be displayed by pod if it is the type of information for which it would be desirable to have such information accessible on display screen 300 throughout the day, and more detail about such information may be available via the related application 242 that can be displayed in application display window 318 at the same time or at different times as described herein. For example, a program related to news may have an agent that retrieves news stores from a variety of sources, and the program may display a single news headline and a short summary of the story in the pod window via its pod 252, with multiple such summarized stories scrolling through the pod display window 336, 346 over time, and a list of news stories, more detail about the stories and links to a source of each complete news story being displayed in the application display window 318 by the corresponding application 242.

In one embodiment, a pod 252 may be used to collect information and provide it to either the corresponding application 242, or the corresponding agent 232, for example, for transmission to a server via network 213. Pod 252 displays user interface elements to a user via pod display window 346 and receives the user's response. Pod 252 may provide the information received or other information corresponding to this information via a remote procedure call to procedures that are part of the corresponding agent 232 or application 242. The information may be provided as part of the remote procedure call or calls, or the information provided may be stored into program storage 218 and the remote procedure call or calls may designate the location of the information in program storage 218. Application 242 may receive such information (either as part of the call or by retrieving it from program storage 218) and alter a current or subsequent display in the application display window 318 based upon the information. Agent 232 may receive the information in the same or similar manner and provide it or other information related to it via network 213 or may alter the information it provides to either application 242, pod 252 or both based on this information.

In one embodiment, each pod 252 may display in pod display window 336, 346 a user interface control with an icon 332, 342 that allows the user to launch the application 242 (or switch to it so that it is displayed in application display window 318 if it is already running) corresponding to the pod 252 displaying the icon. In one embodiment, such icon, control or both are predefined and available to all pods 252 via console manager 250 so that the control and icon have a consistent look in every pod display window 336, 346, so that it is easy for a user to locate the control that performs that function. (In one embodiment, a similar arrangement is provided by application shell manager 240 to allow the similar control and icon 316 used by applications 242 to have a similar look in one embodiment). In one embodiment, the shape (though not the size or color) of the icon in the control 332, 342 used in the pod display window 336, 346 is approximately a mirror image of the shape of the icon in the control 316 used in the application display window 318, (although in one embodiment, the icon in one type of control 332, 342 is light colored on a dark background and the icon in the other type of control 316 is dark colored on a light background, and the shapes and sizes of the controls are different in each type, controls 332, 342 being round and smaller than control 316, which is larger and rectangular or square with rounded corners in one embodiment) and in one embodiment, the icons are made from arrows that point towards the window 318, 336, 346 that the control 316, 332, 342 affects.

With respect to controls 332, 342, when the user selects the control, 332, 342, the pod 252 that initiated its display, signals pods communication manager 524, which provides an identifier of the pod 252 to master communication manager 522. Master communication manager 522 signals master controller 220 with the identifier of the pod 252. Master controller 220 uses the identifier of the pod 252 to identify the program to which the pod corresponds, and signals application shell manager 240 with an identifier of the application 242 for the program or an identifier the program. Application display manager 420 receives the identifier, identifies the proper application from the program, if necessary, and launches (if the application is not already running) and runs in the application display window 318 the application 242 corresponding to the pod 252 that initiated the signal. In one embodiment, if application shell manager 240 is not running, master controller 240 launches it and then signals it as described above.

Remote Procedure Calls

The dashed lines in at the top of FIG. 2 illustrate the communication capabilities between the agent 232, application 242 and one or more pods 252 of an application program. Similar communication capabilities are in place between the elements of other programs (including those illustrated behind elements 232, 242, 252), but are not illustrated to avoid cluttering the Figure. Two programs are illustrated in the figure, but any number of programs may be used.

A remote procedure call entails the transfer of program control currently executing one element 232, 242, 252 of a program to allow the execution of the procedure specified in the call that is contained in another element 232, 242, 252. When the procedure finishes executing, control may be automatically passed back to the element 232, 242, 252 that made the remote procedure call or not passed back, depending on the embodiment. In one embodiment, master controller 220 coordinates the program flow issues associated with the remote procedure calls.

There are many ways to implement a remote procedure call, and any conventional method may be used. In one embodiment, when the manager 230, 240 or 250 executing the instructions encounters a remote procedure call, it provides an identifier of the procedure to RPC manager 610 of master controller 220. RPC manager 610 saves the state of the machine and the identifier of the calling manager 230, 240, 250, identifies the agent, 232, application 242 or pod 252 corresponding to the identifier of the remote procedure call, and passes control to that procedure in the identified agent 232, application 242 or pod 252 by directing the corresponding manager 230, 240, 250 to begin executing it. When the procedure has finished, control is passed back to RPC manager 610, which identifies the manager 230, 240, 250 that initiated the remote procedure call, restores the preserved state, and directs the identified manager 230, 240, 250 to begin executing the instruction following the remote procedure call.

Referring now to FIG. 7, a method of running one or more programs that communicate information, such as via a network, is shown according to one embodiment of the present invention. A boot loader is loaded 710, for example in response to an operating system command, and the boot loader loads a master controller 712 as described above. The master controller loads and executes 714 an agent manager, application shell manager, and console manager as described above. The application shell manager displays 716 a list or other collection or description of installed programs. A command is received to run one of the programs displayed 718. The master controller is directed 720 to run the program corresponding to the command. If the program corresponding to the command is running 722, the method continues at step 718 (although in one embodiment, not shown, the application corresponding to the running program will be displayed in an application display window as described above) and otherwise 722, an agent and application are optionally identified 724 for the program and the master controller directs 726 an agent manager to run an agent corresponding to the program, and the master controller directs the application shell manager to run 728 the application corresponding to the program. Step 728 may include running the application corresponding to the program in a window in which the application for another program is running, and the application for the other program will thus no longer be visible in that window as described above.

In one embodiment, information for the program is checked 730 to determine whether one or more pods for the program should be run when the program corresponding to the command is started. If so 732, the master controller directs the console manager to load and execute 734 the one or more pod for the program corresponding to the command (and step 732 may include identifying the pod for the program), and the method continues at step 718, and otherwise 732, the method continues at step 718. Step 734 may include displaying the pod in addition to the display of other operating pods as described above.

Referring now to FIG. 8A, a method of executing an agent is shown according to one embodiment of the present invention. An optional wait period may be employed and information is retrieved from, or provided over, a network to or from one or more sources or destinations, optionally according to configuration information, and stored 810. If the communication of such information corresponds to a notification event 812 as described above, information corresponding to that communicated is formatted and a remote procedure call is optionally made to an application corresponding to the agent communicating the information, one or more pods corresponding to the agent communicating the information, or all of these 814 and the method continues at step 810, and otherwise 812, the method continues at step 810.

Referring now to FIG. 8B, a method of responding to a remote procedure call for an agent is shown according to one embodiment of the present invention. The remote procedure call is received 820. The remote procedure call received may be a remote procedure call that provides configuration or other information not to be transmitted over a network or may correspond to information that is to be retrieved or transmitted over a network. If the remote procedure call corresponds to information to be communicated over a network 822, the information may be optionally retrieved according to information in the remote procedure call (or it may be contained therein), optionally formatted, and provided or retrieved over the network 824, and control is returned to the entity that made the call 826.

If the remote procedure call corresponds to information not to be communicated over the network 822, such as configuration information, configuration information or other information is altered according to the remote procedure call 828, and control is transferred to the entity that made the call 826. The retrieval, storage and formatting of information of FIG. 8A may be performed in response to the configuration information received via a remote procedure call or otherwise received.

The steps of FIGS. 8A and 8B may be performed as a result of step 726, as indicated by the dashed line in the Figure.

Figure 9:
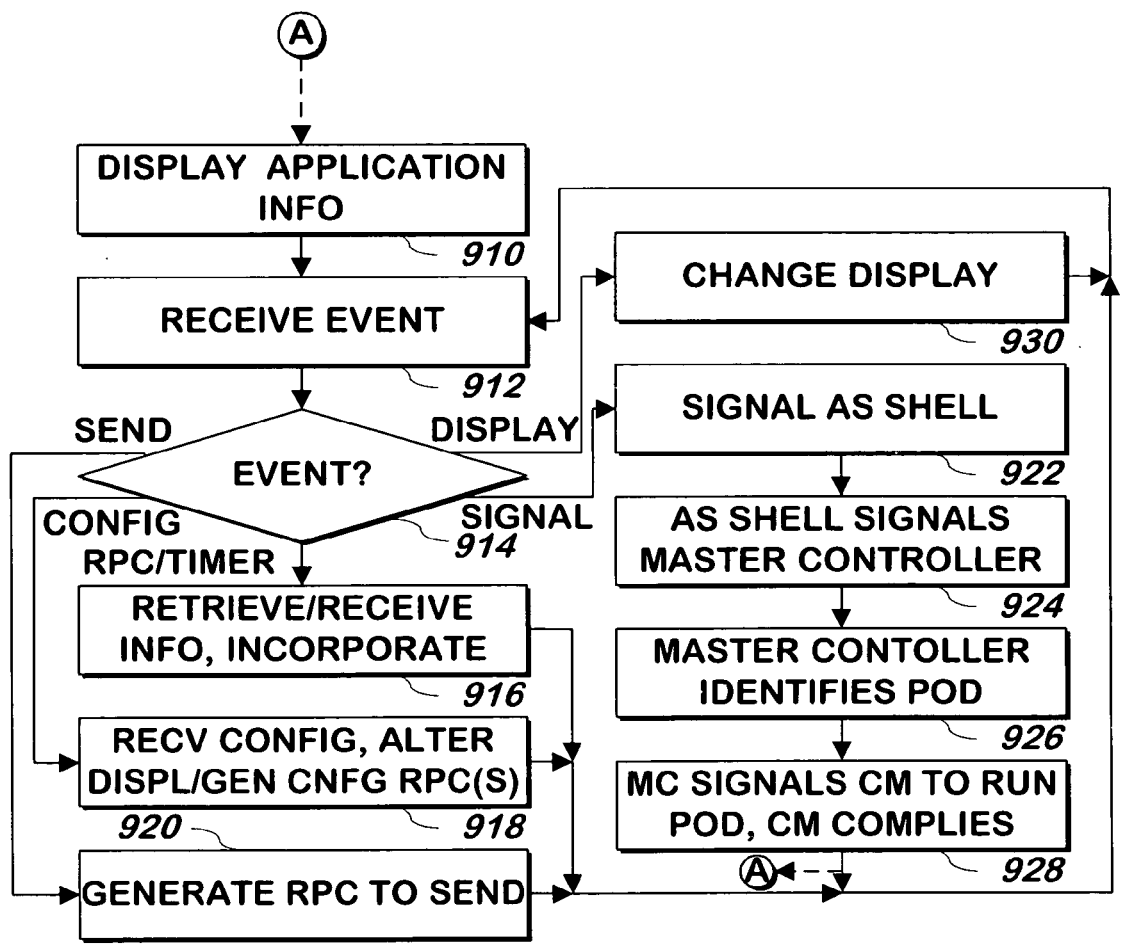
FIG. 9 is a flowchart illustrating a method of executing an application according to one embodiment of the present invention.

Referring now to FIG. 9, a method of executing an application is shown according to one embodiment of the present invention. The steps of FIG. 9, may be performed as a result of step 728 of FIG. 7 or step 1028 of FIG. 10, as indicated by the dashed line in FIGS. 7, 9 and 10. An initial display of the application information is made 910 in a window used for applications for one or more programs, with the information for a single program being displayed at a time in the window as described above, and replacing any display of information from another application that was being made in that same window.

An event may be received 912. If the event is a remote procedure call indicating information has been received 914, information corresponding to the remote procedure call is received or retrieved and incorporated into the display for the application either immediately or at some future time 916. The remote procedure call may be a remote procedure call of the type described in step 814 of FIG. 8A as described above. The method continues at step 912. Step 916 may be performed in response to a timer instead of, or in addition to, a remote procedure call, and may include generating one or more remote procedure call as described above.

If the event is an event corresponding to a change of configuration (e.g. because the user has requested such a change using the window in which the application is displayed or otherwise) 914, configuration information is received, incorporated into the display either immediately or at a future time and one or more remote procedure calls may be generated corresponding to the configuration information, and sent to one or more agents and/or one or more pods, and the method continues at step 912.

If the event corresponds to the receipt of information that should be sent over the network 914, a remote procedure call corresponding to the information to be sent is generated and sent to one or more agents 920 and the method continues at step 912, although in another embodiment, the information to be sent is merely stored and no remote procedure call is generated as part of step 920.

If the event corresponds to a signal to a pod 914, a signal is generated 922 to an application shell under which the application runs, the application shell signals 924 a master controller under which the application shell and one or more pods will run, the master controller identifies the one or more pods corresponding to the application 926 and signals 928 a console to run the one or more pods identified and the console runs the one or more pods corresponding to the signal and the method continues at step 912. Pods are run using a display window not in use by another pod at the time the pod is run, in one embodiment.

If the event corresponds to a signal to change the display 914, the display is changed according to the signal 930 and the method continues at step 912. In one embodiment, the signal is a user supplied signal corresponding to a user interface element and in another embodiment, the signal is a timer signal, and in still another embodiment, either type of signal may be used. If a timer signal is employed, steps 910 and 930 may include setting or resetting the timer.

Figure 10:
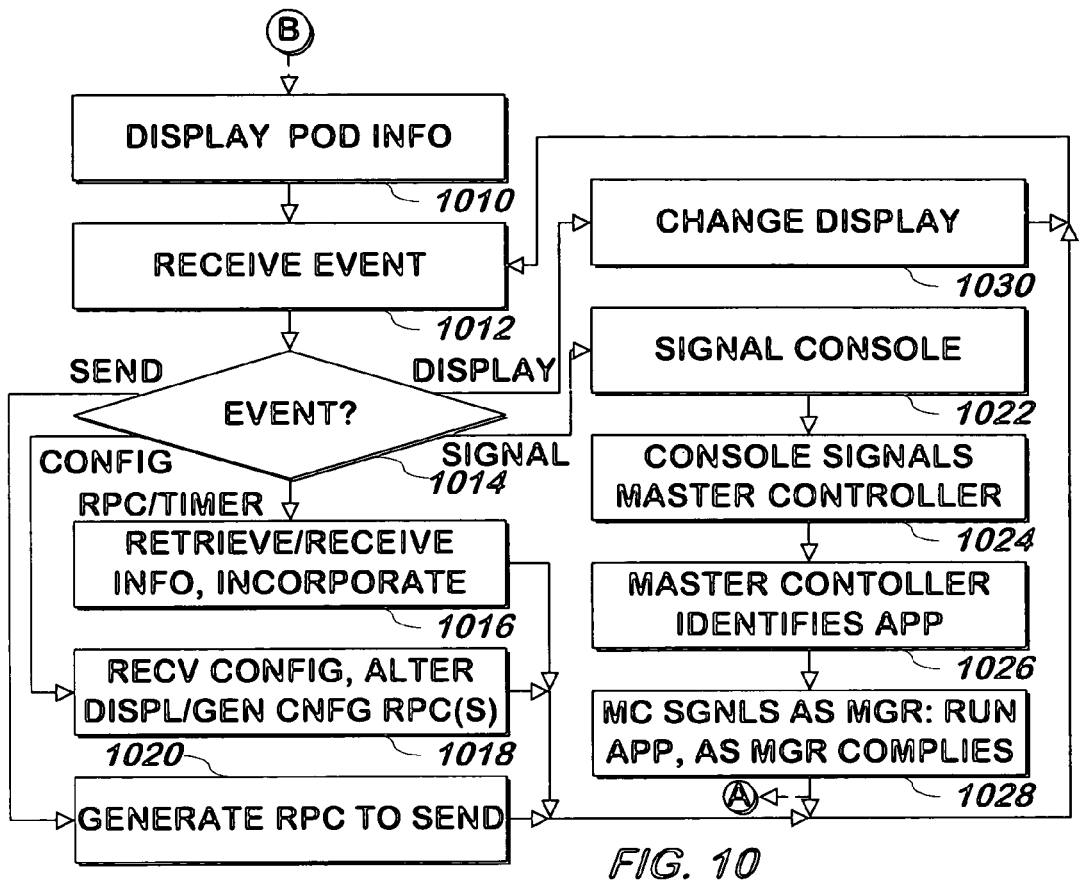
FIG. 10 is a flowchart illustrating a method of executing a pod according to one embodiment of the present invention.

Referring now to FIG. 10, a method of executing a pod is shown according to one embodiment of the present invention. The steps of FIG. 10 may be performed as a result of the performance of steps 734 of FIG. 7 or 928 of FIG. 9, as shown by the dashed lines of FIGS. 7, 9 and 10. An initial display of the pod information is made 1010 in a window not used for pods of other programs.

An event may be received 1012. If the event is a remote procedure call indicating information has been received 1014, information corresponding to the remote procedure call is received or retrieved and incorporated into the display for the pod either immediately or at some future time 1016. The remote procedure call may be a remote procedure call of the type described in step 814 of FIG. 8A as described above. The method continues at step 1012. Step 1016 may be performed in response to a timer instead of, or in addition to, a remote procedure call, and may include generating one or more remote procedure call as described above.

If the event is an event corresponding to a change of configuration (e.g. because the user has requested such a change using the window in which the application is displayed or otherwise) 1014, configuration information is received, incorporated into the display for the pod either immediately or at a future time and one or more remote procedure calls may be generated corresponding to the configuration information, and sent to one or more agents and/or one or more pods, and the method continues at step 1012.

If the event corresponds to the receipt of information that should be sent over the network 1014, a remote procedure call corresponding to the information to be sent is generated and sent to one or more agents 1020 and the method continues at step 1012, although in another embodiment, the information to be sent is merely stored and no remote procedure call is generated as part of step 1020.

If the event corresponds to a signal to start or display an application 1014, a signal is generated 1022 to the console under which the pod runs, the console signals 1024 a master controller under which the console and the corresponding application will run, the master controller identifies the application corresponding to the pod 1026 and signals 1028 the application shell manager to run the application identified and the application shell runs the application corresponding to the signal and the method continues at step 1012.

If the event corresponds to a signal to change the display 1014, the display is changed according to the signal 1030 and the method continues at step 1012. In one embodiment, the signal is a user supplied signal corresponding to a user interface element and in another embodiment, the signal is a timer signal, and in still another embodiment, either type of signal may be used. If a timer signal is employed, steps 1010 and 1030 may include setting or resetting the timer.

Figure 11:
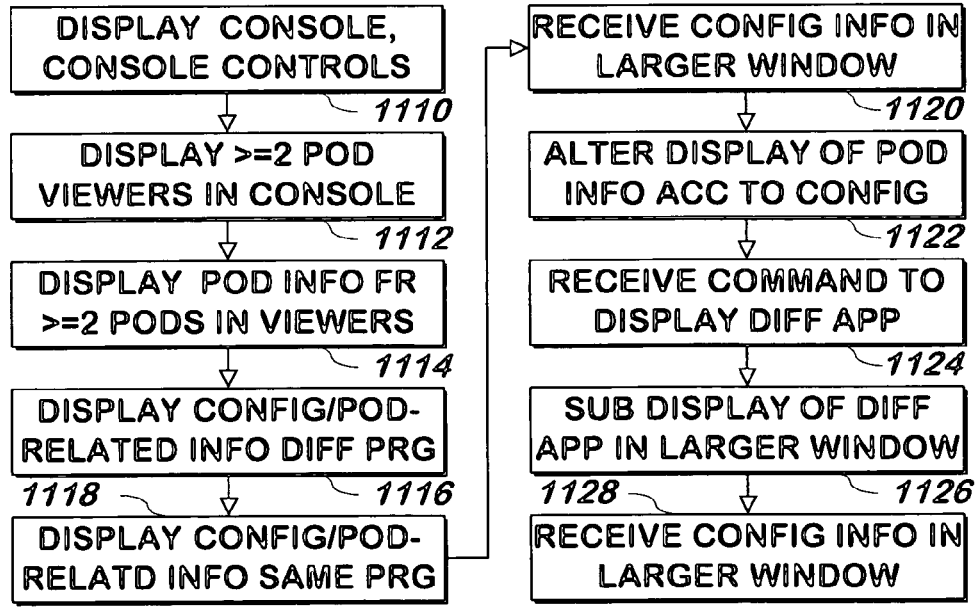
FIG. 11 is a flowchart illustrating a method of displaying information from multiple programs according to one embodiment of the present invention.

Referring now to FIG. 11, a method of displaying information from multiple programs is shown according to one embodiment of the present invention. A console and console controls are displayed 1110 on a display screen as described above. The console controls may be displayed within the console, but not in the pod viewers or pod information. Two or more pod viewers and one or more associated controls in each pod viewer are displayed 1112 in the console as described above, thereby providing a uniform appearance among the pod viewers. Pod information from different programs is displayed 1114 in at least some of the pod viewers as described above, which, because the pod viewers have a uniform appearance, provides a uniform appearance of the area in which the pod information is displayed. Information from one or more of these programs is also displayed 1116 in any number of additional pod viewers.

Configuration information for a program or information of a program related to the information being displayed by one or more pods from one program is displayed 1118 in a window separate from the console and larger than any of the pod viewers. Configuration information is received 1120 from a user via the larger window as described above. The display of pod information in the pod viewer that is associated with the program corresponding to the larger display is altered 1122 in accordance with the configuration information, either because the information is different or the formatting of the information is different, as specified by the configuration information received in step 1120. A command is received to display information about a different application is received 1120, either in the larger window or from a user interface control, such as a push button control displayed with the pod information. The information in the larger window is replaced 1122 by information from a different program: either configuration information, information related to the pod information from a different program, or both. Configuration information for the different program is received 1128 in the larger window and the pod information displayed in the console and corresponding to the other program is altered 1130 in accordance with the configuration information received in step 1128.

What is claimed is:

1. A method of displaying information from a plurality of programs, comprising:

displaying a console window on a display screen, the console window including a plurality of windows displaying information from the plurality of programs, at least some of the plurality of windows each comprising information from different ones of the plurality of programs from others of said plurality of windows, wherein a first window of the plurality of windows displays first information for a program of the plurality of programs, the first information being a subset of displayable information of the program;

displaying an application shell window on the display screen, the application shell window being a separate window from the console window and wherein displaying the application shell window comprises displaying in the application shell window a first application for the program while the other of the plurality of programs run in the background, the first application comprising configuration information for the program that is related to the first information being displayed in the first window and a formatting option for display of the first information in the console window;

receiving updated configuration information via the application shell window, relative to the configuration information;

displaying updated first information in at least one of the plurality of windows within the console window responsive to the updated configuration information received via the application shell window;

displaying a second application in the application shell window, the second application corresponding to a second program;

displaying an icon with the second application for launching from the second application a pod corresponding to the second application in the console window;

receiving a selection of the icon; and responsive to receiving the selection of the icon, launching a pod corresponding to the second application in the console window where the pod was not running before the selection of the icon, the pod comprising information from the second program.

2. The method of claim 1, wherein the pod comprises a first pod;

wherein the icon comprises a first icon;

wherein the plurality of windows comprises a second pod, and further comprising:

displaying a second icon with the second pod for launching from the second pod a third application or for switching to the third application, if the third application is already running, so that the third application is displayed in the application shell window, receiving a selection of the second icon; and
responsive to receiving the selection of the second icon, launching the third application or switching to the third application, if the application is already running, so that the third application is displayed in the application shell window.

3. The method of claim 2 wherein the application shell window is larger than any of the plurality of windows in the console window.

4. The method of claim 2 additionally comprising:
receiving a command to display another application corresponding to one of the other of the plurality of programs in the application shell window; and
displaying the other application in the application shell window in place of the first application.

5. The method of claim 4 wherein the received command comprises a button pressed in one of the plurality of windows in the console window.

6. The method of claim 2 wherein at least a portion of each of the plurality of windows in the console window have a uniform appearance.

7. The method of claim 2 wherein the console window comprises at least one control not contained in any of the plurality of windows.

8. The method of claim 2 wherein at least two of the plurality of windows displayed in the console window display information from a single program.

9. The method of claim 2, further comprising:
obtaining, through an agent of the program, the displayable information, via a network interface;
communicating a remote procedure call, including the updated configuration information, to a pod of the program; and
generating, with the pod of the program, the pod information from the displayable information based on the communicated remote procedure call.

10. The method of claim 9, further comprising:
receiving a command to display the displayable information in place of the configuration information in the application shell window; and
displaying the displayable information in the application shell window.

11. The method of claim 2, wherein the plurality of programs run on one computer system.

12. A system for displaying information from a plurality of programs, the system comprising:
a display screen;
a console display manager for displaying via an output a console window on the display screen;
a pod viewer manager coupled to the console display manager, the pod viewer manager for displaying via an output a plurality of windows in the console window, the plurality of windows displaying information from the plurality of programs, at least some of the plurality of windows each comprising information from different ones of the plurality of programs from others of said plurality of windows, wherein a window of the plurality of windows is for displaying pod information for a program of the plurality of programs, the pod information being a subset of displayable information of the program; and
an applications shell manager for displaying via an output an application shell window on the display screen, the application shell window being a separate window from the console window, and for displaying in the application shell window a first application for the program while the other of the plurality of programs run in the background, the first application comprising configuration information for the program that is related to the pod information being displayed in the window of the plurality of windows and a formatting option for display of the pod information in the console window, and the application shell manager also for receiving updated configuration information via the application shell window, relative to the configuration information; and wherein:
the applications shell manager is coupled to the pod viewer manager for communicating the configuration information received;
the pod viewer manager is configured to display updated pod information in at least one of the plurality of windows within the console window responsive to the updated configuration information received via the application shell window;
wherein the application shell manager is configured to display in the application shell window via the output a second application corresponding to a second program and configured to display via the output an icon with the second application for launching from the second application a pod corresponding to the second application in the console window where the pod was not running before the selection of the icon;
the application shell manager also configured to receive a selection of the icon and to communicate to the pod viewer manager, upon receiving the selection, a request to load a pod corresponding to the second application in the console window; and
the pod viewer manager configured to load the pod corresponding to the second application in the console window, the pod comprising information from the second program.

13. The system of claim 12,
wherein the pod comprises a first pod;
wherein the icon comprises a first icon;
wherein the plurality of windows comprises a second pod, and
wherein the application shell manager is configured to:
receive an identifier of a third application in response to a selection of a second icon displayed with the second pod, the second icon for launching from the second pod a third application or for switching to the third application, if the third application is already running, so that the third application is displayed in the application shell window; and
display the application in the application shell window in response to receiving the identifier of the third application.

14. The system of claim 13 wherein the application shell window is larger than any of the plurality of windows in the console window.

15. The system of claim 13 wherein the application shell manager is further configured to perform operations comprising:
receiving a command to display another application corresponding to one of the other of the plurality of programs in the application shell window; and
displaying the other application in the application shell window in place of the first application.

16. The system of claim 15 wherein the received command comprises a button pressed in one of the plurality of windows in the console window.

17. The system of claim 13 wherein at least a portion of each of the plurality of windows in the console window have a uniform appearance.

18. The system of claim 13 wherein the console window comprises at least one control not contained in any of the plurality of windows.

19. The system of claim 13 wherein at least two of the plurality of windows displayed in the console window display information from a single program.

20. The system of claim 13, further comprising:
an agent of the program for obtaining the displayable information via a network interface; and
wherein the applications shell manager communicates via a remote procedure call, including the updated configuration information, to the pod viewer manager; and
the pod viewer manager generates the pod information from the displayable information based on the remote procedure call.

21. The system of claim 20, wherein the application shell manager is further configured to perform operations comprising:
receiving a command to display the displayable information in place of the configuration information in the application shell window; and
displaying the displayable information in the application shell window.

22. The system of claim 13, wherein the plurality of programs run on one computer system.

23. A computer program product comprising a computer useable medium having computer readable program code embodied therein for displaying information from a plurality of programs, the computer program product comprising computer readable program code devices configured to cause a computer system to:
display a console window on a display screen, the console window including a plurality of windows displaying information from the plurality of programs, at least some of the plurality of windows each comprising information from different ones of the plurality of programs from others of said plurality of windows, wherein a first window of the plurality of windows displays first information for a program of the plurality of programs, the first information being a subset of the displayable information for the program;
display an application shell window on the display screen, the application shell window being a separate window from the console window and wherein displaying the application shell window comprises displaying in the application shell window a first application for the program while the other of the plurality of programs run in the background, the first application comprising configuration information for the program that is related to the first information being displayed in the first window and a formatting option for displaying the first information in the console window;
receive updated configuration information via the application shell window, relative to the configuration information;
display updated first information in at least one of the plurality of windows within the console window responsive to the updated configuration information received via the application shell window;
display a second application in the application shell window, the second application corresponding to a second program;
display an icon with the second application for launching from the second application a pod corresponding to the second application in the console window;
receive a selection of the icon; and
responsive to receiving the selection of the icon, launch a pod corresponding to the second application in the console window where the pod was not running before the selection of the icon, the pod comprising information from the second program.

24. The computer program product of claim 23,
wherein the pod comprises a first pod;
wherein the icon comprises a first icon;
wherein the plurality of windows comprises a second pod, and
additionally comprising computer readable program code devices configured to cause the computer system to perform the operations:
displaying a second icon with the second pod for launching from the second pod a third application or for switching to the third application, if the third application is already running, so that the third application is displayed in the application shell window,
receiving a selection of the second icon; and
responsive to receiving the selection of the second icon, launching the third application or switching to the third application, if the application is already running, so that the third application is displayed in the application shell window.

25. The computer program product of claim 24 wherein the application shell window is larger than any of the plurality of windows in the console window.

26. The computer program product of claim 24 additionally comprising computer readable program code devices configured to cause the computer system to:
receive a command to display another application corresponding to one of the other of the plurality of programs in the application shell window; and
display the other application in the application shell window in place of first application.

27. The computer program product of claim 26 wherein the received command comprises a button pressed in one of the plurality of windows in the console window.

28. The computer program product of claim 24 wherein at least a portion of each of the plurality of windows in the console window have a uniform appearance.

29. The computer program product of claim 24 wherein the console window comprises at least one control not contained in any of the plurality of windows.

30. The computer program product of claim 24 wherein at least two of the plurality of windows displayed in the console window display information from a single program.

31. The computer program product of claim 24 additionally comprising computer readable program code devices configured to cause the computer system to:
obtain, through an agent of the program, the displayable information, via a network interface;
communicate a remote procedure call, including the updated configuration information, to a pod of the program; and
generate, with the pod of the program, the pod information from the displayable information based on the communicated remote procedure call.

32. The computer program product of claim 31 additionally comprising computer readable program code devices configured to cause the computer system to:
receive a command to display the displayable information in place of the configuration information in the application shell window; and
display the displayable information in the application shell window.

33. The computer program product of claim 24, wherein the plurality of programs run on one computer system.

* * * * *